Figure 1:
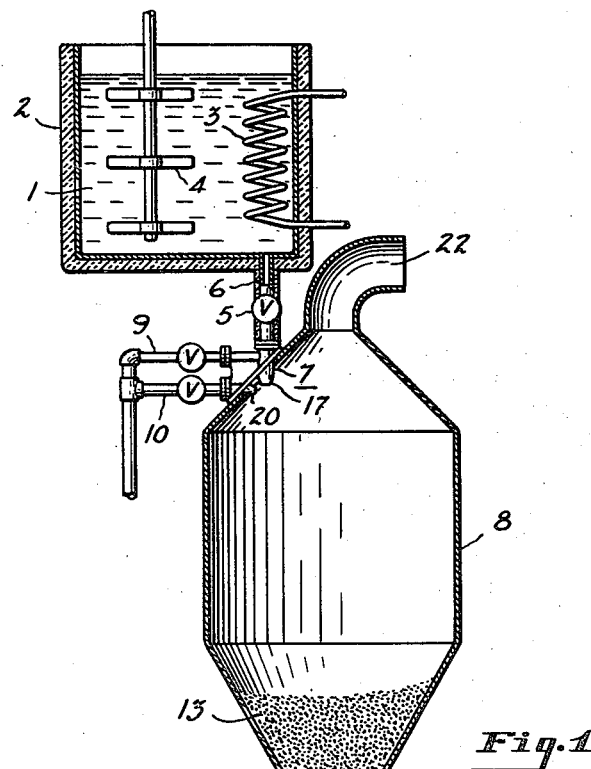

May 26, 1942.  E. W. SCRIPTURE, JR  2,284,023

EMULSIFIABLE COMPOSITION AND METHOD OF PREPARING SAME

Filed Feb. 3, 1940

INVENTOR
*Edward W. Scripture, Jr.*
BY
*Evans + McCoy*
ATTORNEYS

Patented May 26, 1942

2,284,023

UNITED STATES PATENT OFFICE 2,284,023

EMULSIFIABLE COMPOSITION AND METHOD OF PREPARING SAME

Edward W. Scripture, Jr., Shaker Heights, Ohio

Application February 3, 1940, Serial No. 317,178

13 Claims. (Cl. 252—316)

This invention relates to a process for the preparation of emulsions, more particularly of emulsions of meltable materials which are solid at ordinary atmospheric temperatures.

It is an object of this invention to provide a method for preparing emulsions and dispersions of solid, meltable materials.

It is another object of this invention to provide solid, meltable, water-insoluble organic materials in a form which may be packaged in the dry state and yet may be readily dispersed in water.

It is a further object of this invention to provide solid, water-repellant materials which may be packaged in paper bags for addition to cement, concrete or mortar, and which disperse readily in cement mixes and impart water-repellant properties to a hardened structure.

Figure 2:
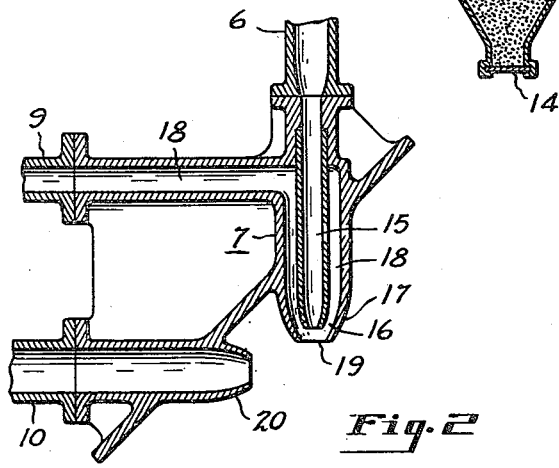

Other objects will be apparent from the following description of the product, and of the method for preparing the same, as is illustrated in the drawing where:

Figure 1 is an elevational view partly in section of suitable apparatus for preparing the atomized, melted solid material and, Fig. 2 is an enlarged sectional view of a preferred type of spray nozzle.

An emulsion consists of a liquid medium in which are suspended minute droplets of a second liquid. If the melting point of the second liquid is above the temperature at which the emulsion is kept, then these droplets become solidified particles. When the droplets are oil and the medium is water, then the emulsion is said to be of the oil in water type. If the reverse is true, it is said to be of the water in oil type. For such a fine division of the dispersed phase, it is obvious that agitation is required during preparation of the emulsion. On the other hand, a third material, such as a soap or similar colloid, is necessary to lower the interfacial tension so that very fine drops can easily be formed, and so that their tendency to recombine is restricted, at the same time providing a film surrounding each particle which mechanically prevents it from coalescing with others. It will be apparent that the requirements for the formation of an emulsion are two liquids of which one is usually but need not necessarily be water, or two materials which can be liquified at the temperatures at which the emulsion is to be formed. It is necessary that these two liquids be substantially immiscible or insoluble in each other. A further requirement is a reagent, usually called an emulsifying agent, which will facilitate the dispersion of the disperse phase and will stabilize it in the dispersed condition, and these agents are usually of the type of soaps or similar colloids. Finally, it is necessary that the emulsion be prepared under conditions, with respect to the composition of the emulsion, the type and proportion of the emulsifying agent, and under mechanical agitation, such that a high degree of dispersion is attained.

The usual materials which are used to form emulsions are solvents, such as petroleum solvents, oils, waxes, animal and vegetable oils, fats, greases, asphalts and similar materials. It is also possible to form emulsions of materials having higher melting points than the boiling point of the continuous phase by incorporating in the disperse phase a small amount of material, such as a solvent, which will lower the melting point below the boiling point of the continuous phase. It is sometimes possible to form an emulsion of a material which is soluble in the continuous phase by incorporating it in an insoluble solvent. A solution of a solid in a liquid or a mixture of two or more liquids or two or more solids may constitute either phase of the emulsion. Furthermore, certain solids, such as fine powders and abrasives, may be incorporated in the emulsion.

There are four well-known methods of forming emulsions. The first method consists in stirring into a soap alternately the oil and water. For example, to one-third of the oil is added the soap, and these are stirred together until homogeneous. Stirring vigorously, a volume of water equal to the oil present is added slowly, thereby forming a thick creamy emulsion. Then the remainder of the oil is added with continuous stirring, and finally the rest of the water in a similar manner.

In the second method, the soap or emulsifying agent is added to the water; usually the solution is heated and then the oil or wax, in a melted condition, is added and stirred vigorously. Stirring is continued gently until the product has cooled.

The third method is known as the soluble oil method. The usual oils to be put into soluble form are the mineral oils. The emulsifying action is brought about by dissolving a soap in the oil; with the proper compound, or similar proportions of soap in the oil, the whole will readily emulsify in water.

A fourth method involves the preparation of two solutions, one consisting of the oil and the acidic portion of a soap, as, for example, oleic acid, the other of the water and the basic portion of the soap, as, for instance, triethanolamine.

The oil solution is added to the water solution with violent agitation.

The formation of emulsions is to a considerable extent empirical and specific. Different emulsions are more suitably prepared by a different one of the four methods described. The emulsifying agent is specific in its action, in that one emulsifying agent will be more suitable for a particular emulsion than another. The particular proportion of the various components, the conditions under which the emulsion is best formed with respect to temperature, agitation, and even order and rate of addition of the different ingredients, vary with each particular emulsion, and must usually be determined mainly by trial and error.

I have found that it is possible to prepare readily dispersible solids from which emulsions may be readily prepared by melting materials which are solids at ordinary temperatures, mixing a suitable emulsifying agent with the material, atomizing the melted material through a spray nozzle, such as a paint spray, and then cooling the atomized liquid particles to the solid state. This material may then be added to the second liquid medium and an emulsion formed by agitation. The atomization operation may be performed by spraying the melted liquid through a simple nozzle, the material to be atomized being forced under pressure, as by air, or it may be sprayed through a nozzle in which the material to be atomized is further broken up by mixing with air under pressure within the nozzle. Or again, the material to be atomized may be forced through the nozzle, and there further broken up by air under pressure, meeting the spray from the nozzle at a point just exterior to the nozzle, or the air may be introduced both within the nozzle and exterior to it.

The direct spray nozzle, in which no air is mixed with the material to be atomized, produces a somewhat coarser product which emulsifies less readily. A finer product is produced by the use of air introduced into the material to be atomized, either internally or externally with respect to the nozzle, and where both internal and external air are used the product is still finer. The fineness of the atomized material is also governed by the pressure at which it is sprayed, the higher pressures producing a finer subdivision, and also by the amount of air introduced during spraying. The fineness of the product is also obviously dependent on the size of the orifice of the nozzle through which the material is forced. The finer the product, the more easily will it form an emulsion subsequently when added to the liquid phase.

Referring more particularly to the drawing, the material 1 to be atomized, comprising a normally solid, meltable, organic material and a suitable emulsifying agent, is placed in the tank 2 where it is melted or maintained in melted condition by heat from the steam coil 3, and thoroughly mixed by the stirrer 4. The molten material flows at a suitable rate, which may be regulated by the valve 5, through the pipe 6 into the atomizer nozzle 7 at the top of the settling and cooling chamber 8, where it is atomized by suitable means as by compressed air admitted through the pipes 9 and 10 to produce a spray. The spray settles by gravity to the bottom of the chamber, and during the settling the small liquid particles cool below the melting point and solidify into small solid particles 13 which do not adhere together and which are collected on the bottom portion of the chamber 8. By opening the valve 14, the collected solids may be removed and incorporated in suitable packages for use as a waterproofing material, or for forming emulsions or dispersions. Since the atomized particles contain an emulsifying agent, they disperse readily when agitated with liquids to form emulsions or dispersions, depending on the temperature of the liquid and melting point of the material.

When the finely divided material is a long chain hydrocarbon having 16 or more carbon atoms, such as the solid paraffins, or a solid fatty acid, such as stearic, palmitic, etc., or esters of such soap forming fatty acids with the longer monohydric alcohols, such as carnauba wax, beeswax, etc., or other water-repellant, normally solid, meltable, organic material, which may be readily incorporated in suitable mixes for waterproofing purposes, etc., an advantageous use for this finely divided material is to improve the water resistance of hydraulic cements and mortars. The finely divided material may be readily incorporated in wet or dry cement or mortar mixes. When mixed with water it disperses throughout the mix and gives the hardened resultant structure excellent water repelling properties so that its water absorption is materially decreased and its weather resistance improved.

An enlarged view of a suitable atomizing apparatus wherein the melted liquid is mixed with air in the nozzle is illustrated in Fig. 2. The melted liquid entering through the tube 15 is partially atomized in the portion 16 of the nozzle 17, where it is mixed with air supplied from a suitable source through the pipe 9, the passageway 18 of the nozzle, out of the orifice 19. The particles leaving the orifice 19 may be sufficiently small for most purposes, but a still finer spray may be produced by contacting the jet from the orifice 19 with a high speed jet of air from pipe 10 and the nozzle 20. If it is not desired to use both of the pipes 9 and 10 for the passage of air, either pipe may be omitted, but the atomized material, although having a satisfactory fineness for most purposes, will have somewhat larger particles than those produced when air is admitted at high velocity through both passageway 18 and nozzle 20. The air admitted into the chamber 8 may pass out through the vent 22 at relatively low velocity. Additional air for cooling the atomized particles may also be passed through the chamber 8.

It will be apparent that a large number of substances, such as fats, fatty acids, rosins and other meltable resins, paraffins, asphalts, etc., may be emulsified in the manner set forth.

For a material to be suitable for the preparation of true emulsions, having a liquid dispersed within a liquid which is immiscible therewith, it should have a melting point below the boiling point of the liquid constituting the continuous phase and be insoluble in and immiscible with the continuous phase. However, the term emulsion as used herein is intended to include dispersions of meltable, organic materials, and hence it is unnecessary for the melting point of the material to be less than the boiling point of the continuous phase desired. It should be substantially insoluble therein, however.

Ordinarily, the continuous phase is water and it is desirable to have the melting point of the dispersed phase below the boiling point of water, but this need not necessarily be the case. Ordinarily, the melting point of the disperse phase should also be above normal atmospheric temperatures, but it is possible to prepare an emulsion according to this process with a material of lower melting point if artificial refrigeration is employed to cool the sprayed product and to store it at a temperature below its melting point.

Many different materials may be employed as emulsifying agents. The particular emulsifying agent and the proportion in which it is to be used will depend on the particular materials to be emulsified and the type of emulsion to be formed. Among useful emulsifying agents are ammonium linoleate, morpholine, sodium or potassium soaps of oleic or stearic acids, amine soaps of oleic or stearic acids, etc. For emulsifying fatty acids, bases alone, such as sodium or potassium hydroxides, may be used, or organic bases, such as the amines, for example triethanolamine, since these bases form a soap with the fatty acid to be emulsified. In some cases it is even possible to produce an emulsion without the addition of an emulsifying agent.

The following examples in which the parts are by weight illustrate the invention:

*Example 1*

| | Parts |
|---|---|
| Stearic acid | 200 |
| Triethanolamine | 9 |

The stearic acid is melted and the triethanolamine added to the melted mixture and thoroughly stirred therein. This melted mixture is then sprayed through a suitable spray, such as a paint spray, cooled in the atomized condition in air, and collected in finely divided solid form. The finely divided solid material is mixed with 400 parts of water, and an emulsion or dispersion formed by vigorous stirring. If desired, the dry, finely divided solid material may be mixed with dry cement, or into cement or mortar mixes, in which cases it disperses substantially uniformly throughout the cement, and imparts excellent water repelling properties to the hardened structure.

*Example 2*

| | Parts |
|---|---|
| Stearic acid | 200 |
| Sodium stearate (ordinary soap) | 9 |

These materials were mixed and sprayed as in Example 1 to form a powder which may be readily dispersed in a liquid. The stearic acid in Examples 1 and 2 may be substituted by solid hydrocarbons, such as paraffin, the esters of fatty acids, particularly with the longer chain monohydric alcohols, examples of such esters being carnauba wax, beeswax, etc. Other meltable, water-insoluble, organic materials may be also prepared in a solid dry form which may be dispersed in water in a similar manner.

It will be seen that the products prepared in accordance with this invention are dry and may be packed in ordinary paper or fabric bags and the like for use as water-repellant materials for cement or mortar mixes and the like, or for the preparation of emulsions or dispersions, as may be desired. Since the product contains only the disperse phase which readily mixes with water and produces a dispersion or emulsion, there is no danger of freezing, which frequently destroys ordinary emulsions, and the cost of shipping, storage, handling, etc. is reduced.

Furthermore, it is to be understood that the particular form of product shown and described, and the particular procedure set forth, are presented for purposes of explanation and illustration, and that various modifications of said product and procedure can be made without departing from my invention as defined in the appended claims.

What I claim is:

1. A process of preparing a readily emulsifiable, water-insoluble solid which comprises heating a solid, meltable, water-insoluble, organic material above its melting point, forming a mixture of said meltable material and an emulsifying agent, atomizing and projecting the mixture into a gas, and cooling the atomized liquid particles below their melting point while suspended in gaseous media, whereby a finely divided, water-insoluble solid material which may be readily dispersed without melting is produced.

2. A process of preparing a readily emulsifiable or dispersible, water-insoluble solid which comprises heating above its melting point a water-insoluble, organic material having a melting point below the boiling point of water and above atmospheric temperatures, forming a mixture of said melted material and an emulsifying agent, atomizing and projecting the mixture into air in the absence of a continuous phase of immiscible liquid and while they are separated by gas films, and cooling the atomized liquid particles below the melting point of the material, whereby a finely divided, water-insoluble solid material which may be readily dispersed without melting is produced.

3. A process of preparing a readily emulsifiable, free fatty acid which comprises heating a solid fatty acid above its melting point, forming a mixture of said melted fatty acid and an emulsifying agent, atomizing and projecting the liquid mixture into a gas, and cooling the atomized liquid below the melting point of the fatty acid while suspended in said gaseous phase, whereby a finely divided, water-insoluble solid material which may be readily dispersed without melting in water is produced.

4. A process of preparing a readily emulsifiable solid which comprises heating a water-insoluble, solid hydrocarbon above the melting point, forming a mixture of said melted hydrocarbon and an emulsifying agent, atomizing and projecting the melted mixture into a gaseous phase, and cooling the atomized liquid below the melting point while it is suspended in a gas.

5. A process of preparing a readily emulsifiable solid which comprises heating a wax above its melting point, forming a mixture of said melted wax and an emulsifying agent, atomizing and projecting the melted mixture into a gas, and cooling the atomized liquid particles below their melting point while they are suspended in said gas.

6. A process of preparing a readily emulsifiable solid which comprises heating a solid paraffin above its melting point, forming a mixture of said melted paraffin and an emulsifying agent, atomizing and projecting the melted mixture into a gas, and cooling the atomized liquid particles below their melting point while suspended in said gas.

7. A process of preparing a readily emulsifiable, dry solid, which contains a free fatty acid in substantial proportion and which may be packaged in ordinary paper containers for addition to cement or concrete, comprising melting stearic acid, forming a mixture of said melted acid and an emulsifying agent, atomizing and projecting the melted material into a gas, and cooling the atomized liquid particles below their melting point while suspended in gaseous media.

8. A process for preparing emulsions and dispersions of a water-insoluble and water-immiscible, meltable, organic solid, which comprises melting a water immiscible, normally solid, organic material, forming a mixture of said melted material and an emulsifying agent, atomizing and projecting the mixture into a gas, cooling the atomized liquid particles below the melting point of the material while they are suspended in the gas, and dispersing the unmelted finely divided solid material in a liquid which is a nonsolvent therefor.

9. The process for preparing emulsions and dispersions of a water-insoluble, meltable, organic solid, which comprises melting a normally water-insoluble, solid, organic material, forming a mixture of said melted material and an emulsifying agent, atomizing and projecting the mixture into a gas, cooling the atomized liquid particles below the melting point of the material while they are suspended in the gas, and agitating the finely divided water-insoluble solids thus obtained in water to disperse them.

10. A process of preparing an emulsion of a water-insoluble, meltable, organic solid, which comprises melting a water-insoluble, organic material having a melting point below the boiling point of water and above atmospheric temperatures, forming a liquid mixture of said material and an emulsifying agent, atomizing and projecting the liquid mixture into a gas, cooling the atomized liquid particles below the melting point of the material while in the atomized state, and in the absence of an immiscible liquid, and agitating the finely divided solids in a nonsolvent and immiscible liquid to disperse them.

11. A process of preparing an emulsion of a solid, free fatty acid which comprises melting the free fatty acid, forming a mixture of said melted fatty acid and an emulsifying agent, atomizing and projecting the liquid mixture into a gas, cooling the atomized liquid particles below the melting point of the fatty acid when in the atomized state, and in the absence of an immiscible liquid, and agitating the finely divided solids in water.

12. A process for producing a waterproofing material for concrete or mortar containing at least one water-insoluble, meltable solid in major proportion, which comprises melting a normally solid water-insoluble, organic material which is repellant to and substantially unaffected by water, atomizing and projecting the melted material into a gas, cooling the material in the atomized condition and in the absence of a continuous phase of an immiscible liquid to below its melting point, whereby finely divided, water-insoluble solids having a particle size about that of an atomized spray are produced.

13. A process for producing a finely divided, water-insoluble, waterproofing material for concrete or mortar, which comprises atomizing and projecting into a gas a melted water-insoluble, water-repellant, organic material having an emulsifying agent mixed therewith, and cooling the atomized liquid below the melting point of the material, said cooling being accomplished with the material in the atomized state and in the absence of a continuous phase of immiscible liquid, whereby a finely divided, water-insoluble solid material which may be readily dispersed is produced.

EDWARD W. SCRIPTURE, Jr.